United States Patent Office 2,869,910
Patented Jan. 20, 1959

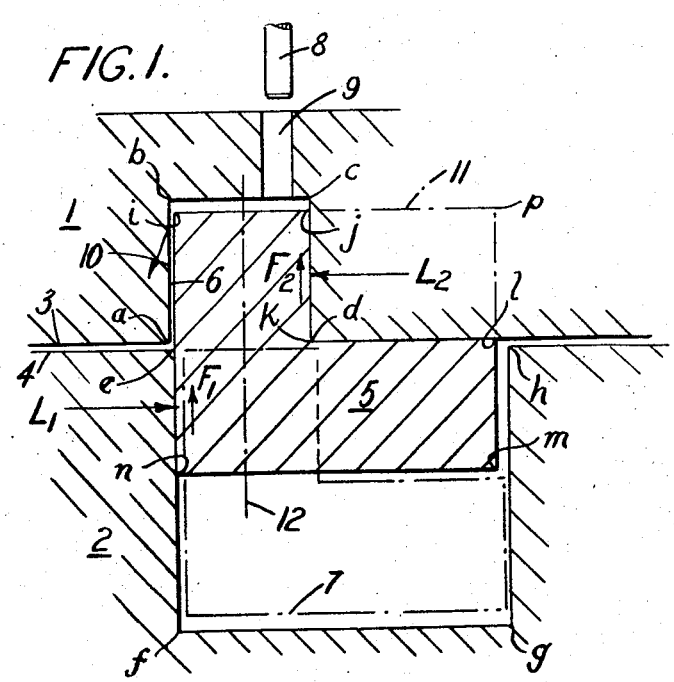
FIG. 1.
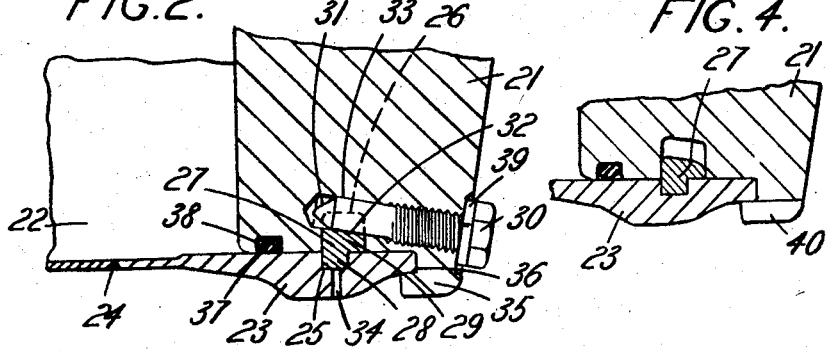
FIG. 2.
FIG. 4.
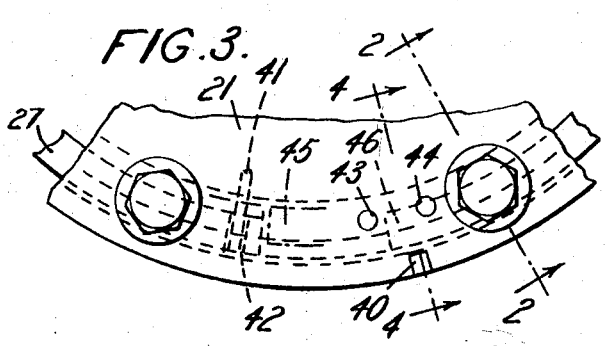
FIG. 3.

2,869,910
SNAP RING DEVICES

William Thoby Fisher and James Platt, Bristol, England, assignors to Bristol Aircraft Limited, Bristol, England, a British company Application January 28, 1957, Serial No. 636,622

Claims priority, application Great Britain February 20, 1956

8 Claims. (Cl. 292—256.67)

This invention relates to snap ring connections and concerns such connections removably securing together two members having contiguous cylindrical faces. Such connections commonly comprise a groove around the cylindrical bore of the outer member, a groove around the peripheral surface of the inner member and a split ring lodged in the grooves, one of the grooves having a radial depth not less than the radial depth of the ring and the other groove being about half this depth. In the locked position the ring projects from the shallower groove into the deeper groove and thus acts as an annular key, and for disengagement of the members the ring is retracted wholly into the deeper groove.

Where a connection of this kind is made between two members subject to a powerful relative displacement force in an axial direction there is a tendency for the ring to be twisted due to the fact that the loads on the two loaded faces of the ring act at different radial distances from the axis of the assembly. Twisting of the ring is especially objectionable where one or both of the members joined is made of malleable material or is of small radial thickness so as to be liable to deformation by the forces produced.

An object of the present invention is to provide an improved snap ring connection in which the resistance to twisting of the ring is increased. The improved connection may have an asymmetrical form suitable for resisting axial loads principally in one direction only or a symmetrical form suitable for loading equally in both directions.

Another object is to provide a snap ring connection having means whereby it may be checked that the connection is properly locked.

Another object of the invention is to provide a snap ring connection for attaching an end closure member or partial end closure member to a thin-walled tubular member highly stressed by internal fluid pressure. In such a structure any twisting of the ring tends to cause bell-mouthing of the end of the tubular member. By reducing the tendency for the ring to twist, the device according to the invention reduces the danger of bell-mouthing, but the danger can be still further reduced by providing, in accordance with another object of the invention, a hook connection between the closure member and the tubular member which is continuous or discontinuous around the end of the tubular member to prevent said end from moving away from the closure member.

These and other objects of the invention will conveniently be more fully explained with reference to the accompanying drawings in which:

Figure 1 is a diagrammatic representation of one form of a device according to the invention, greatly enlarged, to illustrate the principle of operation, Figure 2 is a section through the periphery of a closure embodying the invention, Figure 3 is an end elevation of part of the periphery of the closure shown in Figure 2, the section plane of the latter being shown at 2—2, and Figure 4 is a section at the plane 4—4 of Figure 3 showing a detail of construction.

The diagram, Figure 1, shows a radial section through two members 1 and 2 having contiguous cylindrical faces 3 and 4 respectively. It is immaterial which of these faces is convex and which is concave. Rectangular section grooves are formed in the faces 3 and 4, the groove in the face 3 being denoted by the corner points $a$, $b$, $c$, and $d$ and the groove in the face 4 by the corner points $e$, $f$, $g$ and $h$. The groove $e$, $f$, $g$, $h$ is of greater axial width than the other groove and also of greater radial depth. A snap ring 5 is lodged in the grooves and has an L-shaped cross-section denoted by the corner points $i$, $j$, $k$, $l$, $m$ and $n$. The peripheral portion of the ring 5 denoted by the points $e$, $i$, $j$, and $k$ is of such width as to fit closely within the narrower of the grooves $a$, $b$, $c$, $d$, a small clearance 6 shown on the left-hand side for the purpose of indicating that under the conditions illustrated these faces are not in load-transmitting contact with one another. The remaining cross-section of the ring denoted by the points $e$, $k$, $l$, $m$ and $n$ constitutes a peripheral portion which is wider than the groove $a$, $b$, $c$, $d$. The ring 5 is of such dimensions as to be capable of being contained wholly within the wider of the grooves $e$, $f$, $g$, $h$ as indicated by the dotted line 7. The members 1 and 2 and the ring 5 are shown in their assembled and locked relation and it will be seen that the wider of the grooves $e$, $f$, $g$, $h$ wholly overlies the narrower of the grooves $a$, $b$, $c$, $d$, apart from the small clearance space 6 which, in principle, may be disregarded. It will also be seen that the wider peripheral portion $e$, $k$, $l$, $m$, $n$, of the ring 5 comprises a cylindrical face $k$, $l$ adapted to bear on the cylindrical face 3 of the member 1 formed with the narrower of the grooves. In the present example the ring 5 is assumed to be made in one piece, i. e. with one slit through its cross-section, from elastic material such as spring steel in such a way that the resilience of the material tends to change the diameter of the ring from that indicated by the dotted line 7 to that indicated by the full line, in which the diameter of the cylindrical face $k$, $l$ of the ring is equal to the diameter of the cylindrical face 3 of the member 1. In other words, the ring springs into the locked relation of the parts. Unlocking may be effected, for example, by inserting tools such as 8 through holes 9 to push the ring back into the wider groove $e$, $f$, $g$, $h$.

In Figure 1, it is assumed that the member 2 is under load towards the right relatively to the member 1 thus applying a load L1 to the face $e$, $n$ of the ring and an equal and opposite load L2 to the face $j$, $k$. These loads produce a shear stress across the section of the ring between the points $e$ and $k$ and also tend to rotate the ring section in an anti-clockwise direction. Such rotation tends to occur about the corner $l$ of the ring as a fulcrum and is resisted partly by the stresses produced in the ring itself and partly by the friction forces $F_1$ and $F_2$ produced by the loads $L_1$ and $L_2$ respectively, the force $F_1$ acting with a lever arm equal to $e, l$ and the force $F_2$ with a lever arm equal to $k, l$. If the clearance 6 is sufficiently small there will also be some restraint by mechanical interference between the corner $i$ of the ring, moving in the direction of the arrow 10, and the side $a, b$ of the smaller groove. If the L-shaped ring were replaced by a rectangular ring $i, p, m, n$ of equal width as indicated by the chain-dotted line extension 11, the force $F_2$ would be transferred to the face $p, l$ of the ring and would produce no restraint against rotation of the ring section about any point in the face $p, l$. The total moment of resistance to twisting would thus be reduced by $F_2 \times kl$ less the increase in the moment of resistance of the ring itself due to its increased cross-sectional dimensions. For conditions of high stress this represents a net loss. Obviously the width of the narrower peripheral portion $e, i, j, k$ of the ring should be reduced to the minimum required to carry the shear stress across the section between the points $e$ and $k$ and the width of the wider portion should be as great as reasonably practicable.

For loading in the reverse direction to that shown in Figure 1 the ring operates similarly to a circumscribing rectangular ring, except that its moment of resistance is reduced by the part cut away. The configuration of Figure 1 is therefore most suitable for resisting loads in the directions shown but it is clear that to meet the requirements of equal loading in both directions the ring section can be made symmetrical about a transverse plane 12 passing centrally through the narrower of the peripheral portions.

Figures 2, 3 and 4 show a constructional example in which the invention is applied to removably securing a closure member 21 made of light alloy to the end of a thin-walled steel tube 22 subject to high internal fluid pressure. The end of the tube 22 is reinforced by a thicker steel rim member 23 welded to the tube at 24. The narrower of the groover is formed in the rim member 23 as shown at 25 and the wider in the closure member 21 as shown at 26, both grooves being substantially rectangular in cross-section. The ring 27 comprises a narrower peripheral portion 28 which fits closely in the groove 25 and a wider peripheral portion 29 which has the same width as the groove 26 but less depth, so that the whole cross-section of the ring can be accommodated in the groove 26. The ring is made in one piece from spring steel, its outer diameter when relaxed being not more than that of the inner face of the rim 23 so that when free from constraint it retracts wholly into the groove 26 and the closure member 21 is free to be removed.

To lock the closure member 21 in position the ring is pressed outwardly by a number of screws 30 engaging its inner face at points spaced around its periphery so that the smaller peripheral portion 28 of the ring enters the groove 25. For this purpose the screws 30 are provided with conical tips 31 and a chamfer 32 of corresponding angle is formed on the inner face of the ring. The remainder of the inner face of the ring is arranged at the same angle in radial planes as the axes of the screws, so that after the ring has been expanded by the conical tips 31, a cylindrical portion 33 formed on the screw crosses the inner face of the ring and provides additional restraint against twisting. The cylindrical portions 33 also ensure that when the screws 30 are driven fully home so that their heads are locked by locking washers 39 the ring will necessarily have been expanded to the correct depth of engagement in the groove 25.

To allow for the possibility of the ring becoming jammed in the groove 25 a number of small holes 34 may be provided extending through the rim 23 into the groove 25 so that the ring may be pressed out by inserting a suitable tool.

Where, as in the present example, the ring is moved positively into the locked position it would clearly be possible to make the ring in two or more arcuate parts instead of having only one split in the ring.

As a further safeguard against the rim member 23 being forced outwardly by twisting of the ring 27, the closure member 21 is provided with a hook-shaped lip 35 engaging over a spigot 36 formed on the rim. The device may also include a sealing ring 37 lodged in a groove 38 formed in the closure member 21 to ensure fluid tightness of the assembly.

Since the lip 35, if continuous around the periphery of the closure member 21, would prevent visual checking that the spigot 36 is fully entered into the lip before an attempt is made to expand the ring by tightening the screws 30, the lip is preferably slotted as shown at 40 in Figures 3 and 4 at two diametrically opposite positions.

To provide an additional means of inspection to ascertain that the ring is correctly fitted and expanded the ring may be anchored at one end by a peg 41 extending into a clearance hole 42 in the ring, and a hole 43 proved in the closure member 21 at a position where it will only be uncovered by the other end of the ring to permit insertion of a pin to the full depth of the groove 26 when the ring is fully expanded so that the end of the ring has moved from the position 45 shown in chain-dotted lines to the position 46. The provision of another hole 44 at a position where it will always be covered by the ring similarly permits a check to be made that the ring has not been omitted from the assembly, correct assembly being indicated by the fact that an inspection pin enters to a greater depth into the hole 43 than into the hole 44.

We claim:

1. A snap ring connection for removably securing together at contiguous cylindrical faces a thin walled tubular member and a further member, said connection comprising a groove formed in and extending around each of the said faces, one of the said grooves being of greater axial width than the other of the said grooves and substantially wholly overlying said other groove in the assembled relation of the members, a split one-piece ring of elastic material capable of being contained wholly within the wider of the said grooves, said ring comprising one peripheral portion wide enough to fit closely within the narrower of the said grooves, and another peripheral portion, wider than the narrower of the said grooves, said wider peripheral portion having a cylindrical face adapted to bear on the cylindrical face of the member formed with the narrower of the said grooves, and means for positively locating one end of said ring in relation to at least one of said members, said one of said members having a straight opening from the exterior of the member into the groove in the member, for checking that said one peripheral portion of the ring is fully entered into the narrower of said grooves.

2. A connection as claimed in claim 1, wherein the ring when unstressed lies wholly within the wider of said grooves, means being provided for deforming the ring to force said one peripheral portion of the ring fully into the narrower of said grooves and to hold the ring with its said one peripheral portion fully entered into the narrower of said grooves, said opening being located so as to be obstructed by said ring except when said one peripheral portion of the ring is fully entered into the narrower of said grooves.

3. A connection as claimed in claim 2, wherein the member having the narrower of said grooves is provided with a number of holes allowing access to the peripheral face of the narrower peripheral portion of the ring.

4. A connection as claimed in claim 2, wherein another straight opening is provided in said one of said members from the exterior of the member into the groove in the member where it will always be obstructed by the ring.

5. A connection as claimed in claim 1, wherein said further member is an end closure for said thin walled tubular member, the connection comprising a hook connection between the closure member and the end of the tubular member for preventing said end from moving away from the closure member.

6. A connection as claimed in claim 5, wherein said hook connection comprises a hook-shaped lip on the closure member engaging over a spigot on said tubular member.

7. A connection as claimed in claim 6, wherein said hook-shaped lip is continuous around the periphery of said closure member, and the lip is slotted at two diametrically opposite positions to allow a visual check that the spigot is fully entered in the hook-shaped lip.

8. A connection as claimed in claim 1, wherein said locating means comprises a peg extending through a hole in said one of said members and a clearance hole in the ring.

References Cited in the file of this patent

UNITED STATES PATENTS

| | | |
|---|---|---|
| 1,734,236 | Smith et al. | Nov. 5, 1929 |
| 1,809,404 | Culbertson | June 9, 1931 |
| 2,268,507 | Gertzon | Dec. 30, 1941 |
| 2,390,445 | Mercier | Dec. 4, 1945 |
| 2,645,513 | Sterrett | July 14, 1953 |
| 2,650,992 | Forss et al. | Sept. 1, 1953 |
| 2,729,491 | Seider | Jan. 3, 1956 |